US008081456B2

(12) United States Patent
Iguchi

(10) Patent No.: US 8,081,456 B2
(45) Date of Patent: Dec. 20, 2011

(54) INFORMATION PROCESSING APPARATUS AND METHOD FOR CONTROLLING INFORMATION PROCESSING APPARATUS

(75) Inventor: Junji Iguchi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 138 days.

(21) Appl. No.: 12/571,679

(22) Filed: Oct. 1, 2009

(65) Prior Publication Data
US 2010/0103608 A1   Apr. 29, 2010

(30) Foreign Application Priority Data
Oct. 23, 2008   (JP) .................. 2008-273191

(51) Int. Cl.
  *H05K 7/20*   (2006.01)
(52) U.S. Cl. ............ 361/695; 361/679.48; 361/690; 417/2; 700/300; 62/259.2; 454/184

(58) Field of Classification Search ............. 361/679.31, 361/679 I, 48, 679, 49, 679.54, 688, 690, 361/694, 695
See application file for complete search history.

(56) References Cited

U.S. PATENT DOCUMENTS

| 6,396,688 B1* | 5/2002 | Davies et al. ............ 361/679.48 |
| 6,398,505 B1* | 6/2002 | Sekiguchi .................... 417/2 |
| 6,654,894 B2* | 11/2003 | Kaminski et al. ............. 713/300 |
| 7,894,191 B2* | 2/2011 | Tsuchiya .................... 361/695 |
| 2006/0142901 A1* | 6/2006 | Frankel et al. ................ 700/300 |
| 2010/0103608 A1* | 4/2010 | Iguchi ..................... 361/679.48 |

FOREIGN PATENT DOCUMENTS
JP   10-009191 A   1/1998
* cited by examiner

*Primary Examiner* — Courtney Smith

(57) ABSTRACT

An information processing apparatus sets a driving keeping voltage for keeping driving of a fan to a voltage that is higher than a voltage that is applied to the fan when the fan is determined not to be rotating after decreasing the voltage that is applied to the fan in a state where the fan is rotating.

8 Claims, 13 Drawing Sheets

FIG. 5

| 406 | 0 | 00 | 01 | 10 | 11 |
|---|---|---|---|---|---|
|  | 1 | V1 | V2 | V3 | V4 |
|  |  | V5 | V6 | V7 | V8 |

408 410

1:ON
0:OFF
V1<V2<V3<V4<V5<V6<V7<V8

FIG. 12

| p | Vs | Vk |
|---|----|----|
| 1 | V4 | V1 |
| 2 | V4 | V2 |
| 3 | V4 | V3 |
| 4 | V5 | V2 |
| 5 | V5 | V3 |
| 6 | V5 | V4 |
| 7 | V6 | V3 |
| 8 | V6 | V4 |
| 9 | V6 | V5 |
| 10 | V7 | V4 |
| 11 | V7 | V5 |
| 12 | V7 | V6 |
| 13 | V8 | V5 |
| 14 | V8 | V6 |
| 15 | V8 | V7 |

INFORMATION PROCESSING APPARATUS AND METHOD FOR CONTROLLING INFORMATION PROCESSING APPARATUS

BACKGROUND OF THE INVENTION

1. Field of the Invention

The present invention relates to an information processing apparatus and a method for controlling the information processing apparatus.

2. Description of the Related Art

An information processing apparatus can be cooled by a fan that vents an inner air outwards.

In general, a fan can be driven by continuously applying a predetermined voltage to the fan. However, a voltage (driving keeping voltage) required for keeping the driving of the fan is lower than a voltage (driving starting voltage) required for starting the driving of the fan. Therefore, if a voltage that is higher than the driving starting voltage is continuously applied to the fan, power may be wastefully consumed.

Japanese Patent Application Laid-Open No. 10-9191 discusses a method for starting driving a fan with a predetermined voltage, and after that, keeping the driving of the fan with another predetermined voltage that is lower than the voltage used at the time when the driving of the fan is started.

The driving starting voltage and the driving keeping voltage of the fan are varied according to an individual variation or the time elapse of the fan.

In the method discussed in Japanese Patent Application Laid-Open No. 10-9191, the voltage for starting the driving of the fan or the voltage for keeping the driving of the fan is usually set to a predetermined value. Therefore, in the method discussed in Japanese Patent Application Laid-Open No. 10-9191, the fan cannot be set to a suitable driving voltage.

SUMMARY OF THE INVENTION

The present invention is directed to an information processing apparatus and a method for controlling the information processing apparatus capable of reducing power consumption at the time of starting driving of a fan by setting a driving starting voltage for starting rotation of the fan to a minimum value required for starting the rotation of the fan.

According to an aspect of the present invention, an information processing apparatus includes a fan configured to exchange air between inside and outside of the information processing apparatus, an applying unit configured to apply a voltage to the fan, a determination unit configured to determine whether the fan is rotating, a setting unit configured to set a driving keeping voltage for keeping driving of the fan to a voltage that is higher than a voltage that is applied to the fan by the applying unit when the fan is determined by the determination unit not to be rotating after decreasing the voltage that is applied to the fan by the applying unit in a state where the fan is rotating, a storage unit configured to store the driving keeping voltage set by the setting unit, and a control unit configured to control the applying unit to apply the driving keeping voltage stored in the storage unit to the fan to keep the driving of the fan.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 5 is a view illustrating a correspondence between a combination of on and off of three transistors and a voltage applied to a fan.

FIG. 12 is a view illustrating a correspondence between a driving voltage pattern p for a transistor and a combination of a driving starting voltage Vs and a driving keeping voltage Vk.

DESCRIPTION OF THE EMBODIMENTS

Various exemplary embodiments, features, and aspects of the invention will be described in detail below with reference to the drawings.

Figure 1:
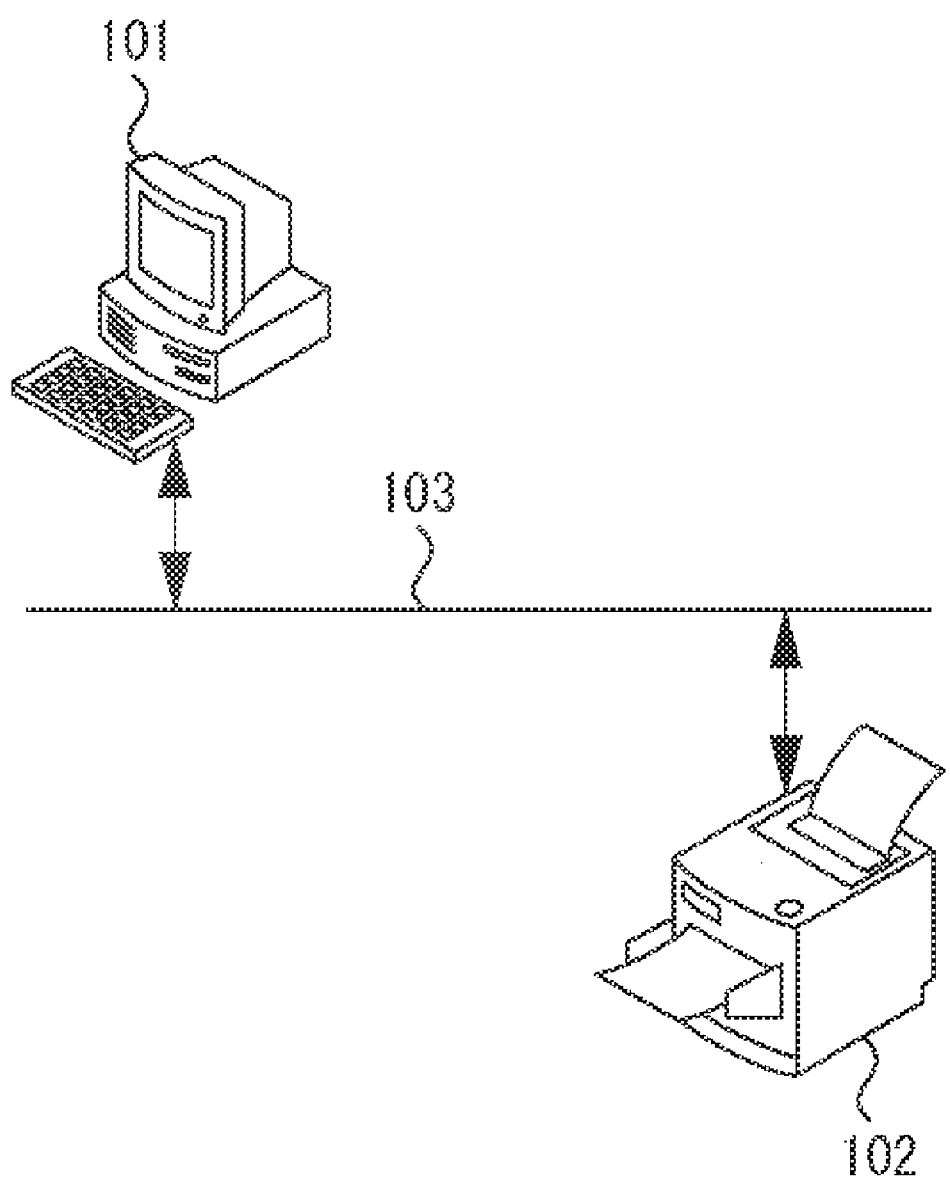
FIG. 1 is a view illustrating a configuration of a system.

FIG. 1 is a view illustrating a configuration of a system according to a first exemplary embodiment of the present invention.

The system includes a personal computer (PC) 101, a printer 102, and a network 103. The PC 101 and the printer 102 are connected via the network 103 to transmit data such as image data. In addition, the PC 101 and the printer 102 may be connected via local connection.

Figure 2:
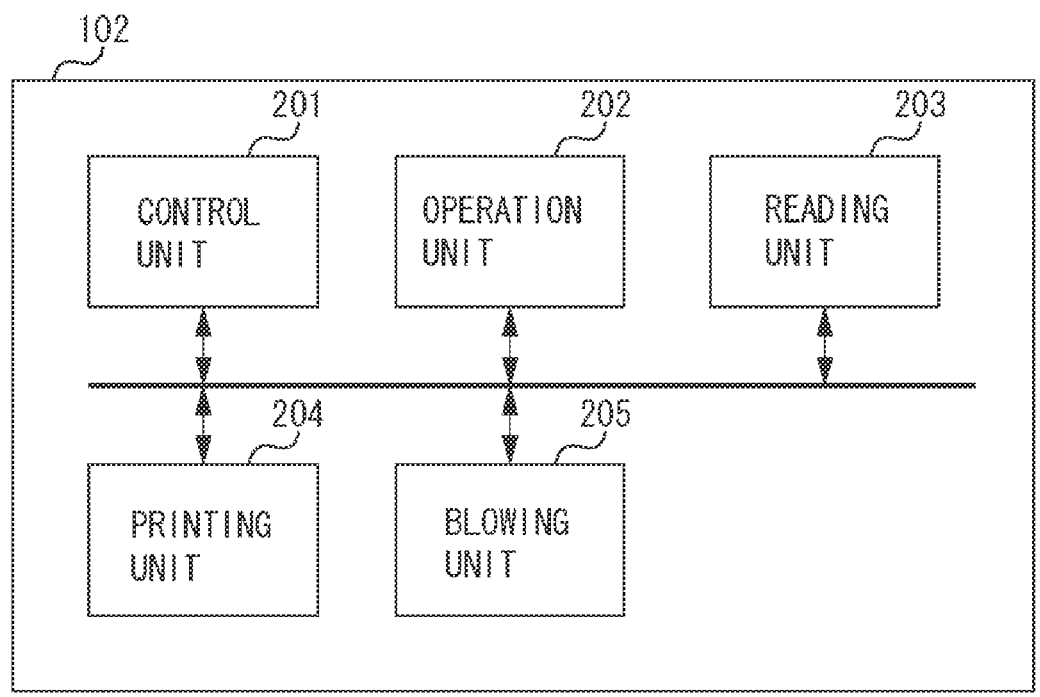
FIG. 2 is a block diagram illustrating a configuration of a printer.

FIG. 2 is a block diagram illustrating a configuration of the printer 102.

A controller 201 controls components 202 to 204 of the printer 102. The controller 201 will be described below in detail with reference to FIG. 3. An operation unit 202 includes a display portion and an input portion. The operation unit 202 provides an operation screen of the printer 102 to a user via the display portion and receives various operations for the printer 102 from the user via the input portion. A reading unit 203 reads image data from an original and inputs the image data to the controller 201. A printing unit 204 forms an image on an output sheet based on the image data on which image processing is performed by the controller 201. A blowing unit 205 blows air to the printing unit 204 to cool the printing unit 204. The blowing unit 205 will be described below in detail with reference to FIG. 4.

Figure 3:
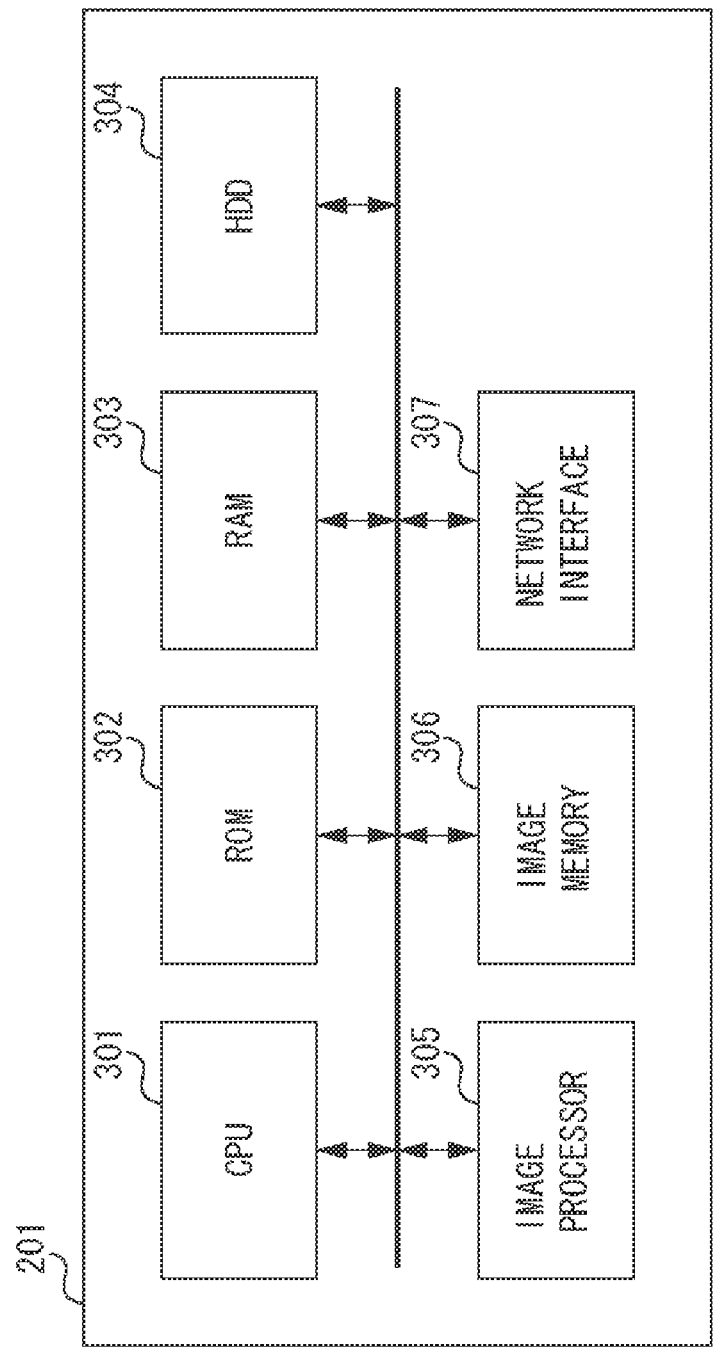
FIG. 3 is a block diagram illustrating details of a controller.

FIG. 3 is a block diagram illustrating details of the controller 201.

A central processing unit (CPU) 301 controls components 202 to 204 of the printer 102 and components 302 to 307 of the controller 201 based on a program loaded on a random access memory (RAM) 303. A ROM (non-volatile storage medium) 302 stores, for example, a boot program executed by the CPU 301. On the RAM (volatile storage medium) 303, programs of an OS or applications that the CPU 301 executes are loaded from a hard disk drive (HDD) 304. The HDD (non-volatile storage medium) 304 stores the programs of the OS or the applications that the CPU 301 executes. An image processor 305 performs various image processes on the image data that is stored in an image memory 306. The image memory (volatile storage medium) 306 temporarily stores the image data that is input from the reading unit 203 or a network interface 307. The network interface 307 performs input and output of the image data from an external apparatus such as the PC 101.

Figure 13:
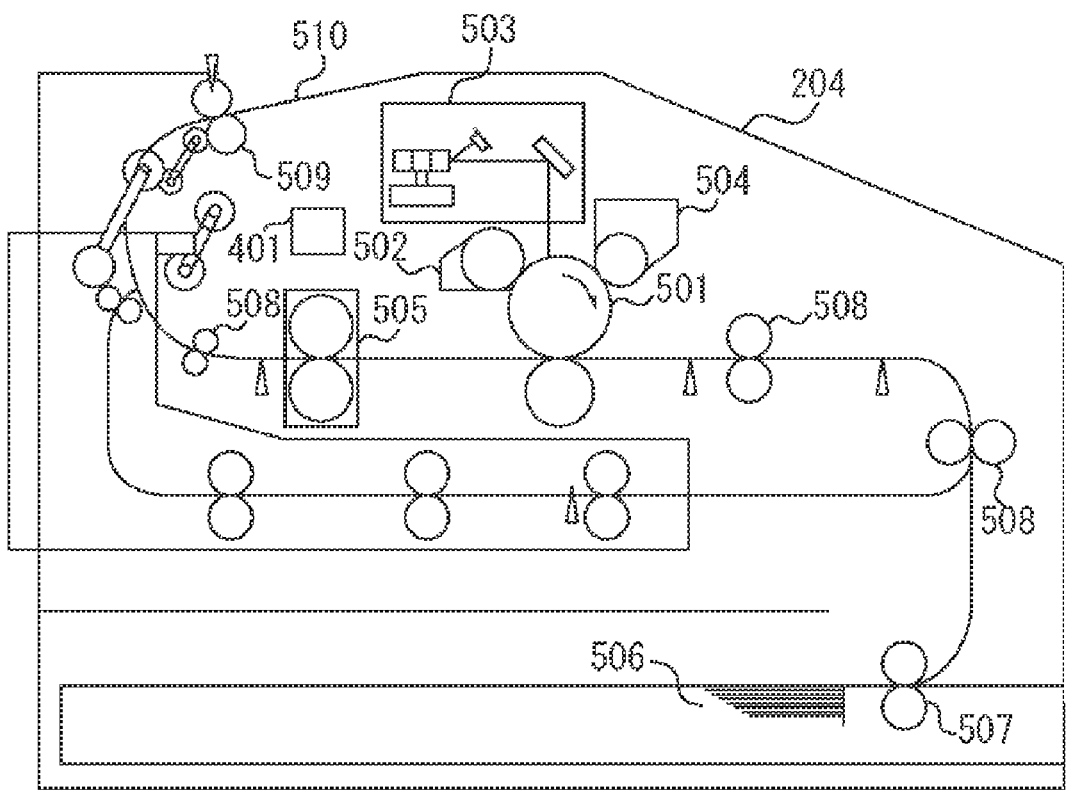
FIG. 13 is a cross-sectional view illustrating details of a printing unit and an installation position of a fan.

FIG. 13 is a cross-sectional view illustrating details of the printing unit 204 and an installation position of a fan 401.

As illustrated in FIG. 13, the fan 401 is disposed in the vicinity of a fixing unit 505 to vent an inner air of the printing unit 204 outwards.

The components 501 to 505 are parts associated with image formation, and the components 506 to 510 are parts associated with sheet transportation. A photosensitive member 501 is used to transfer a developer image on the sheet. A charging unit 502 charges the photosensitive member 501. An exposure unit 503 performs exposure on the charged photosensitive member 501 with illumination light to form an electrostatic latent image. A development unit 504 develops the electrostatic latent image formed on the photosensitive member 501 by using a developer such as toner to form the developer image. The fixing unit 505 fixes on the sheet the developer image that is transferred on the sheet by the photosensitive member 501. A feed tray 506 contains sheets to be used for printing. A feed roller 507 feeds the sheet from the feed tray 506. A transport roller 508 transports the sheet in the printer. A discharge roller 509 discharges the sheet to a discharge tray 510. The discharge tray 510 contains printed sheets.

The print processing in the printing unit 204 is performed under the control of the CPU 301 as follows. First, the exposure unit 503 forms an electrostatic latent image on the photosensitive member 501, which is charged by the charging unit 502. The development unit 504 develops the electrostatic latent image by using a developer such as toner to form the developer image. Next, the sheet of the feed tray 506 is fed by the feeding operation of the feed roller 507. Next, the developer image is transferred on the sheet by the photosensitive member 501. The developer image is fixed on the sheet by the fixing unit 505. Next, the sheet on which the developer image is fixed by the fixing unit 505 is discharged to the discharge tray 510 by the discharging operation of the discharge roller 509.

Figure 4:
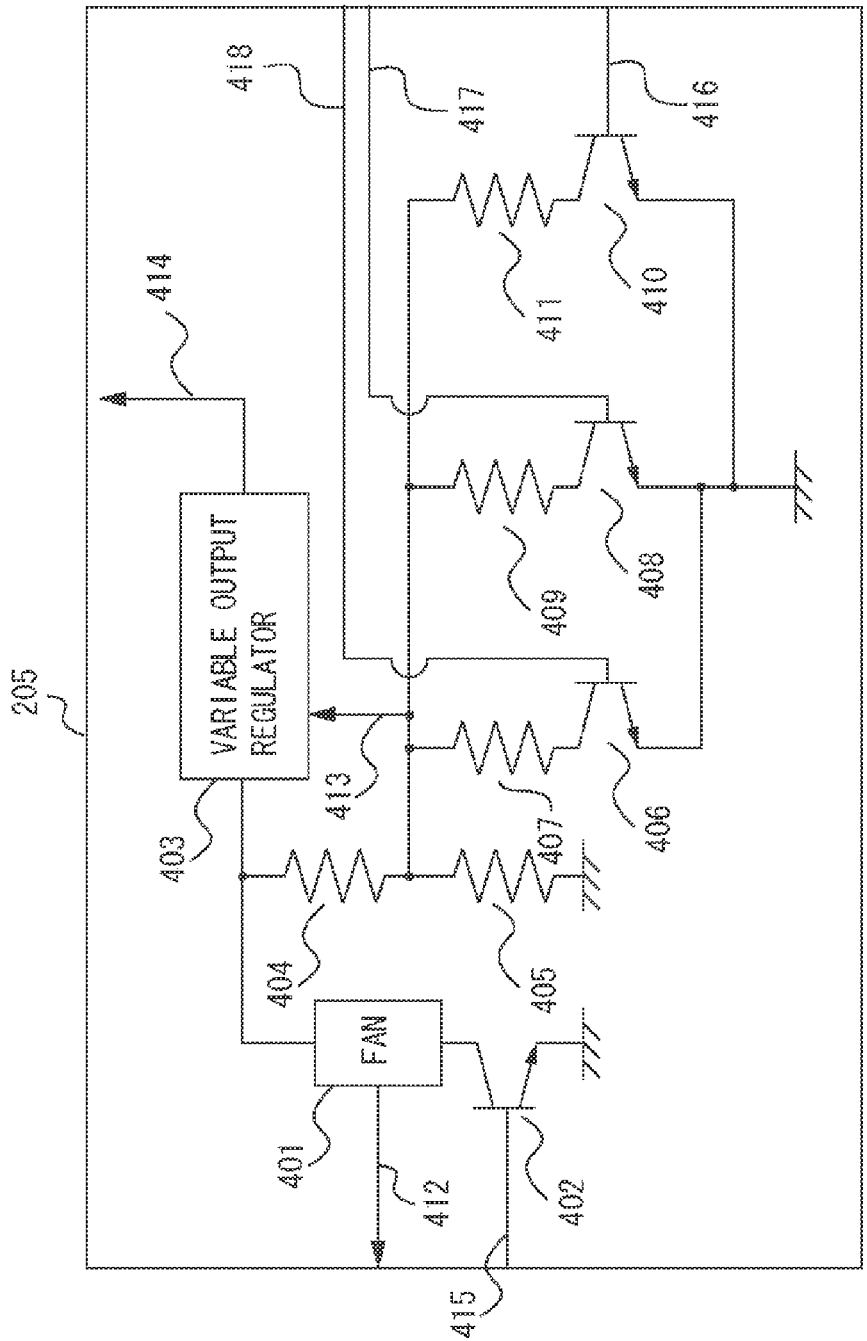
FIG. 4 is a view illustrating details of a blowing unit.

FIG. 4 is a view illustrating details of the blowing unit 205.

A fan 401 vents an inner air of the printing unit 204 outwards and cools the printing unit 204. A fan driving transistor 402 drives the fan 401. A variable output regulator 403 outputs a power supply voltage, which is applied to the fan 401. A resistor 404 is used to define an output voltage of the variable output regulator 403. A resistor 405 is also used to define the output voltage of the variable output regulator 403. A transistor 406 changes the output voltage of the variable output regulator 403. A resistor 407 is connected to the transistor 406 to change the output of the variable output regulator 403. A transistor 408 changes the output voltage of the variable output regulator 403. A resistor 409 is connected to the transistor 408 to change the output of the variable output regulator 403. A transistor 410 changes the output voltage of the variable output regulator 403. A resistor 411 is connected to the transistor 410 to change the output of the variable output regulator 403. A lock signal 412 indicates locking of the fan 401. The lock signal 412 is input from the blowing unit 205 to the CPU 301 of the controller 201 via an internal bus of the printer 102. When the fan 401 is locked, a high lock signal 412 is input from the blowing unit 205 to the CPU 301 of the controller 201. In addition, when the fan 401 is locked by the lock signal 412 as an active signal, a low lock signal 412 may be input. A connection line 413 is used to perform feedback control in the variable output regulator 403. A connection line 414 is connected to a power supply (not shown). Connection lines 415 to 418 are connected to an input/output (I/O) port (not shown) of the controller 201.

In the present exemplary embodiment, the blowing unit 205 is designed to vent an inner air of the printing unit 204 outwards. However, the blowing unit 205 may be designed to intake an outer air to the printing unit 204. In other words, the blowing unit 205 is designed to exchange air between inside and outside of the printing unit 204. In addition, the blowing unit 205 may be designed to exchange air between inside and outside of the printer 102. In addition, the blowing unit 205 may be designed to blow air into the components 501 to 510 of the printing unit 204.

FIG. 5 is a view illustrating a correspondence between a combination of on and off of the transistors 406, 408, and 410 and a voltage applied to the fan 401.

In FIG. 5, "1" denotes the ON state of a corresponding transistor, and "0" denotes the OFF state of a corresponding transistor. The voltage applied to the fan 401 is changed to be one of voltages V1 to V8 (V1<V2<V3<V4<V5<V6<V7<V8) according to a combination of on and off of the transistors 406, 408, and 410.

Figure 6:
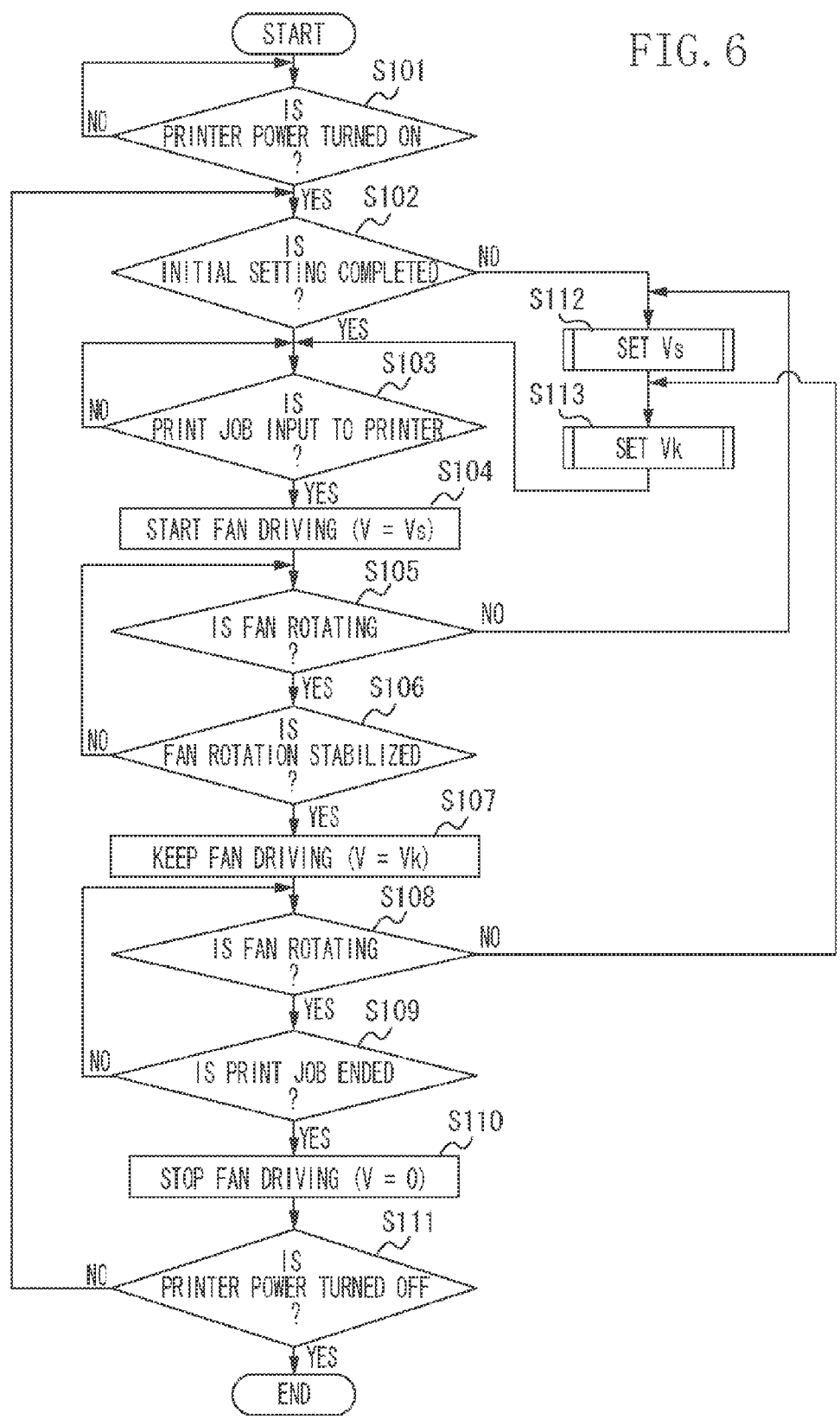
FIG. 6 is a flowchart illustrating control of a printer.

FIG. 6 is a flowchart illustrating control of the printer 102. In addition, the control illustrated in the flowchart is implemented by the CPU 301 reading programs stored in the HDD 304 to the RAM 303 and executing the programs.

First, in step S101, the CPU 301 determines whether the printer 102 is turned on. When the printer 102 is determined to be turned on in step S101 (YES in step S101), the process proceeds to step S102. When the printer 102 is determined not to be turned on in step S101, the CPU 301 is on standby until the printer 102 is turned on.

Next, in step S102, the CPU 301 determines whether initial setting (of the driving starting voltage Vs and the driving keeping voltage Vk of the fan described below) of the printer 102 is completed. When the initial setting of the printer 102 is determined to be completed in step S102, the process proceeds to step S103. When the initial setting of the printer 102 is determined not to be completed in step S102, the process proceeds to step S112.

Next, in step S103, the CPU 301 determines whether a print job is input to the printer 102 by the reading unit 203 or the network interface 307. When the print job is determined to be input to the printer 102 in step S103, the process proceeds to step S104. When the print job is determined not to be input to the printer 102 in step S103, the CPU 301 is on standby until the print job is input to the printer 102.

The print job denotes a job associated with the printing operation such as COPY or PRINT. In addition, the print job includes COPY, PRINT, FAX, SEND, and BOX. COPY denotes printing image data read by the reading unit 203 in the printing unit 204. PRINT denotes printing image data received from the PC 101 by the network interface 307 in the printing unit 204. FAX denotes transmitting and receiving the image data and the like read by the reading unit 203 using a telephone line. SEND denotes transmitting and receiving the image data read by the reading unit 203 using a network. BOX denotes storing the image data and the like read by the reading unit 203 in a storage medium such as the HDD 304.

Next, in step S104, the CPU 301 allows the fan 401 to start driving by applying the driving starting voltage Vs to the fan 401.

Next, in step S105, the CPU 301 determines whether the fan 401 is rotating with the driving starting voltage Vs applied to the fan 401 in step S104. When the fan 401 is determined to be rotating in step S105, the process proceeds to step S106.

When the fan 401 is determined not to be rotating in step S105, the process proceeds to step S112.

Next, in step S106, the CPU 301 determines whether the rotation of the fan 401 is stabilized. When the rotation of the fan 401 is determined to be stabilized in step S106, the process proceeds to step S107. When the rotation of the fan 401 is determined not to be stabilized in step S106, the process proceeds to step S105.

Next, in step S107, the CPU 301 keeps the driving of the fan 401 by applying the driving keeping voltage Vk to the fan 401.

Next, in step S108, the CPU 301 determines whether the fan 401 is rotating with the driving keeping voltage Vk applied to the fan 401 in step S107. In step S108, when the lock signal 412 is at high level, the CPU 301 determines that the fan 401 is locked (is not rotating). In addition, when the lock signal 412 is at low level as an active-low signal, the CPU 301 may determine that the fan 401 is locked (is not rotating). When the fan 401 is determined to be rotating in step S108, the process proceeds to step S109. When the fan 401 is determined not to be rotating in step S108, the process proceeds to step S113.

Next, in step S109, the CPU 301 determines whether the print job input in step S103 is ended in the printing unit 204. When the print job is determined to be ended in step S109, the process proceeds to step S110. When the print job is determined not to be ended in step S109, the process proceeds to step S108.

Next, in step S110, the CPU 301 stops the driving of the fan 401 by setting the voltage applied to the fan 401 to 0.

Next, in step S111, the CPU 301 determines whether the printer 102 is turned off. When the printer 102 is determined to be turned off in step S111, the control ends. When the printer 102 is determined not to be turned off in step S111, the process proceeds to step S102.

When the initial setting of the printer 102 is determined not to be completed in step S102, the next control is executed.

First, in step S112, the CPU 301 sets up the driving starting voltage Vs of the fan 401. Details of step S112 will be described below with reference to FIG. 7.

Next, in step S113, the CPU 301 sets up the driving keeping voltage Vk of the fan 401. Details of step S113 will be described below with reference to FIG. 8.

In the present exemplary embodiment, the fan is designed to be driven during the time interval from the job input and the job end. Alternatively, the fan may be designed to be driven during the time interval from the power on and the power off.

In the present exemplary embodiment, each of the driving starting voltage and the driving keeping voltage of the fan is set to a single voltage. Alternatively, each of the driving starting voltage and the driving keeping voltage of the fan may be set to a plurality of voltages (for example, a voltage for high speed rotation of the fan at the operation time of the printer and a voltage for low speed rotation of the fan at the standby time of the printer).

Figure 7:
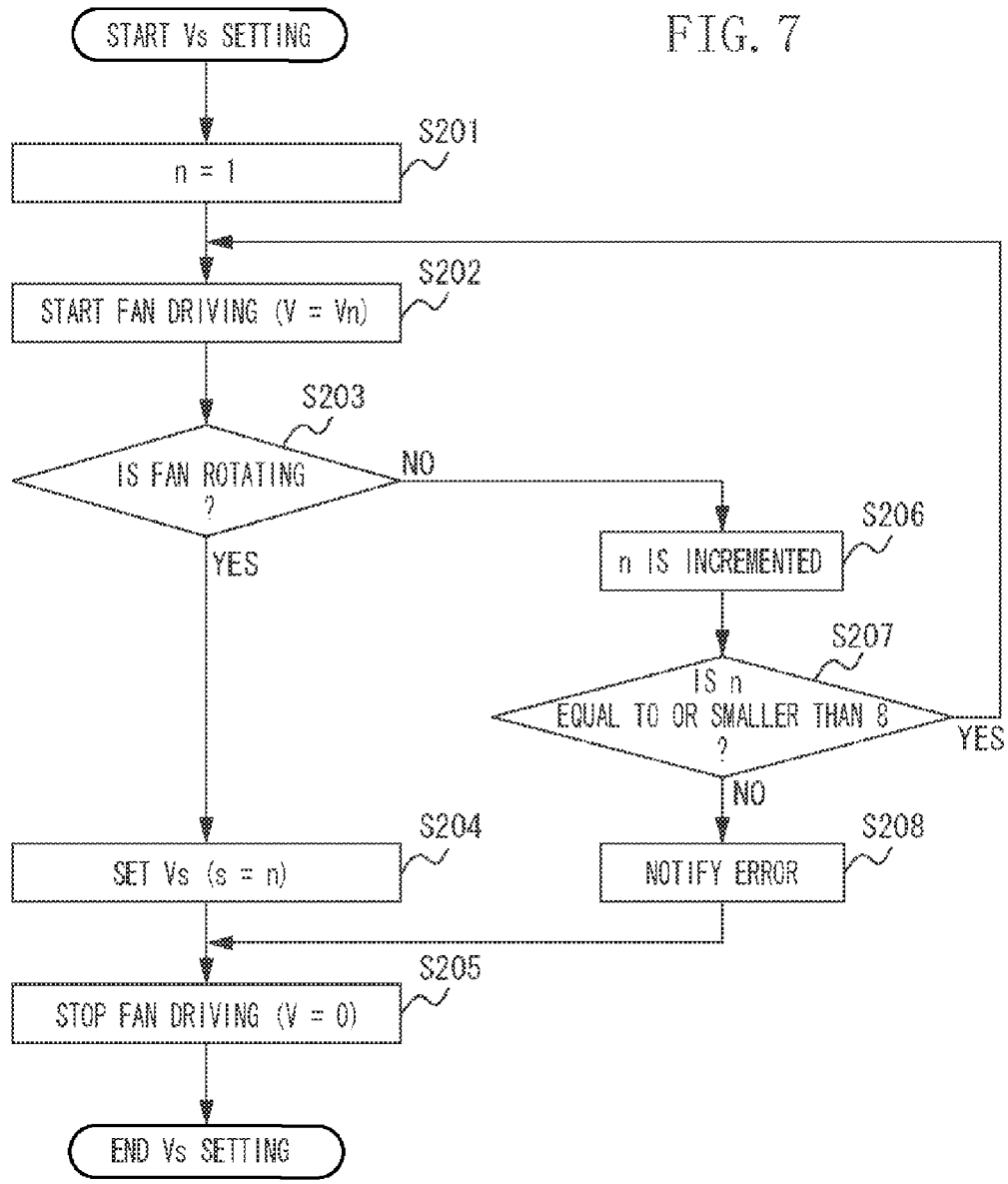
FIG. 7 is a flowchart illustrating details of a driving starting voltage (Vs) setting step S112.

FIG. 7 is a flowchart illustrating details of the Vs setting step S112.

First, in step S201, the CPU 301 assigns 1 to n.

Next, in step S202, the CPU 301 allows the fan 401 to start driving by applying a driving starting voltage Vn to the fan 401.

Next, in step S203, the CPU 301 determines whether the fan 401 is rotating with the driving starting voltage Vn applied to the fan 401 in step S202. When the fan 401 is determined to be rotating in step S203, the process proceeds to step S204. When the fan 401 is determined not to be rotating in step S203, the process proceeds to step S206.

In step S204, when the fan 401 is determined to be rotating in step S203, the CPU 301 sets the value of Vs to the value of Vn corresponding to n at the time when the fan 401 is determined to be rotating in step S203.

Next, in step S205, the CPU 301 stops the driving of the fan 401 by setting the voltage applied to the fan 401 to 0.

In step S206, when the fan 401 is determined not to be rotating in step S203, the CPU 301 executes an increment of the value of n.

Next, in step S207, the CPU 301 determines whether the value of n after the increment in step S206 is 8 or less. When the value of n is determined to be 8 or less in step S207, the process proceeds to step S202. When the value of n is determined not to be 8 or less in step S207, the process proceeds to step S208.

When the value of n is determined not to be 8 or less in step S207, then in step S208, the CPU 301 notifies to a user an error message that the fan cannot be driven. After step S208, the process proceeds to step S205.

Figure 8:
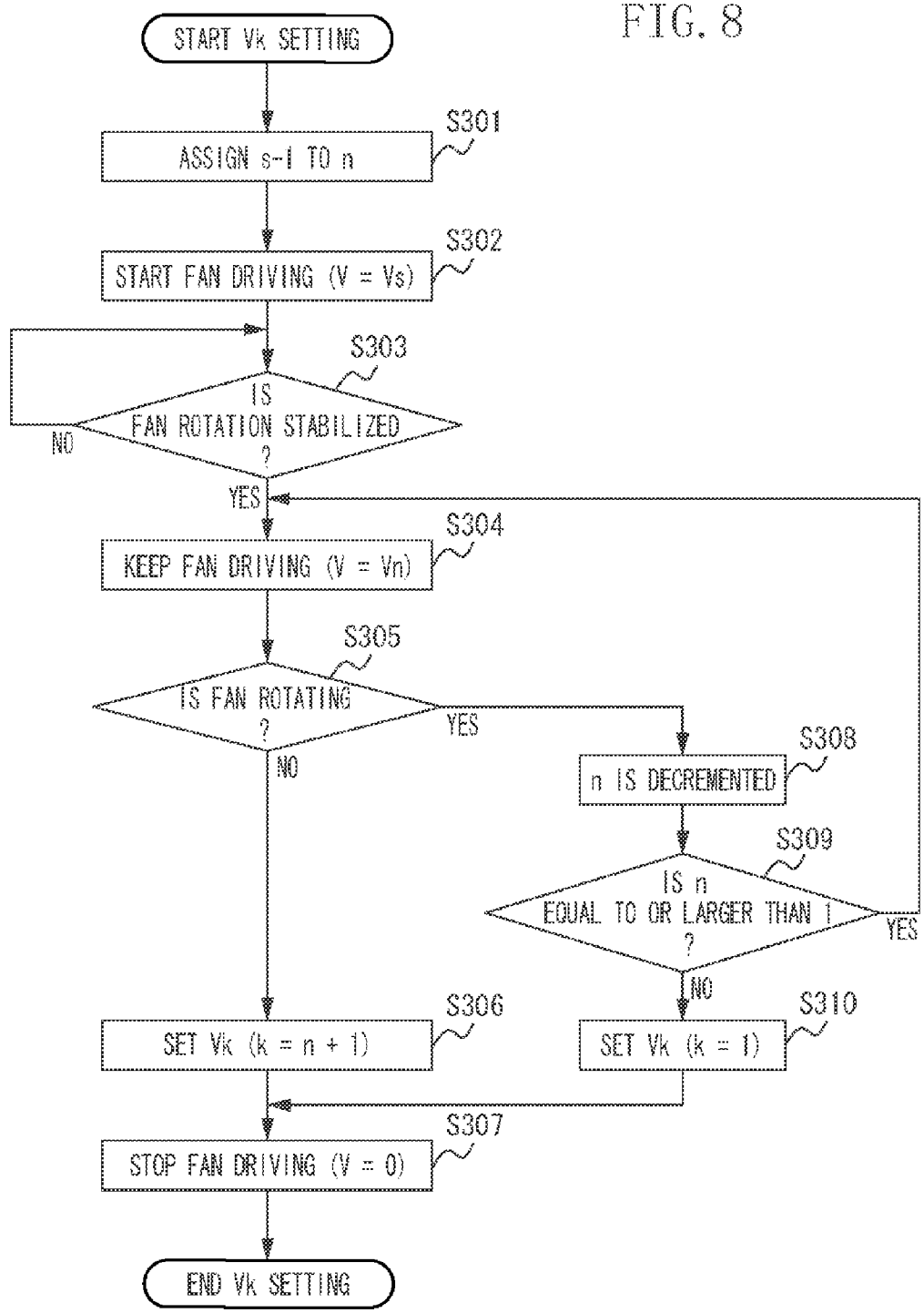
FIG. 8 is a flowchart illustrating details of a driving keeping voltage (Vk) setting step S113.

FIG. 8 is a flowchart illustrating details of the Vk setting step S113.

First, in step S301, the CPU 301 assigns s−1 to n.

Next, in step S302, the CPU 301 allows the fan 401 to start driving by applying the driving starting voltage Vs to the fan 401.

Next, in step S303, the CPU 301 determines whether the rotation of the fan 401 is stabilized. When the rotation of the fan 401 is determined to be stabilized in step S303, the process proceeds to step S304. When the rotation of the fan 401 is determined not to be stabilized in step S303, the CPU 301 is on standby until the rotation of the fan 401 is stabilized.

Next, in step S304, the CPU 301 keeps the driving of the fan 401 by applying the driving keeping voltage Vn to the fan 401.

Next, in step S305, the CPU 301 determines whether the fan 401 is rotating with the driving keeping voltage Vn applied to the fan 401 in step S304. When the fan 401 is determined to be rotating in step S305, the process proceeds to step S308. When the fan 401 is determined not to be rotating in step S305, the process proceeds to step S306.

When the fan 401 is determined not to be rotating in step S305, then in step S306, the CPU 301 sets the value of Vk to the value of Vn corresponding to n+1 at the time when the fan 401 is determined not to be rotating in step S306.

Next, in step S307, the CPU 301 stops the driving of the fan 401 by setting the voltage applied to the fan 401 to 0.

When the fan 401 is determined to be rotating in step S305, then in step S308, the CPU 301 executes the decrement of the value of n.

Next, in step S309, the CPU 301 determines whether the value of n after the decrement in step S308 is 1 or more. When the value of n is determined to be 1 or more in step S309, the process proceeds to step S304. When the value of n is determined not to be 1 or more in step S309, the process proceeds to step S310.

When the value of n is determined not to be 1 or more in step S309, then in step S310, the CPU 301 sets the value of Vk to the value of V1. After step S310, the process proceeds to step S307.

Figure 9:
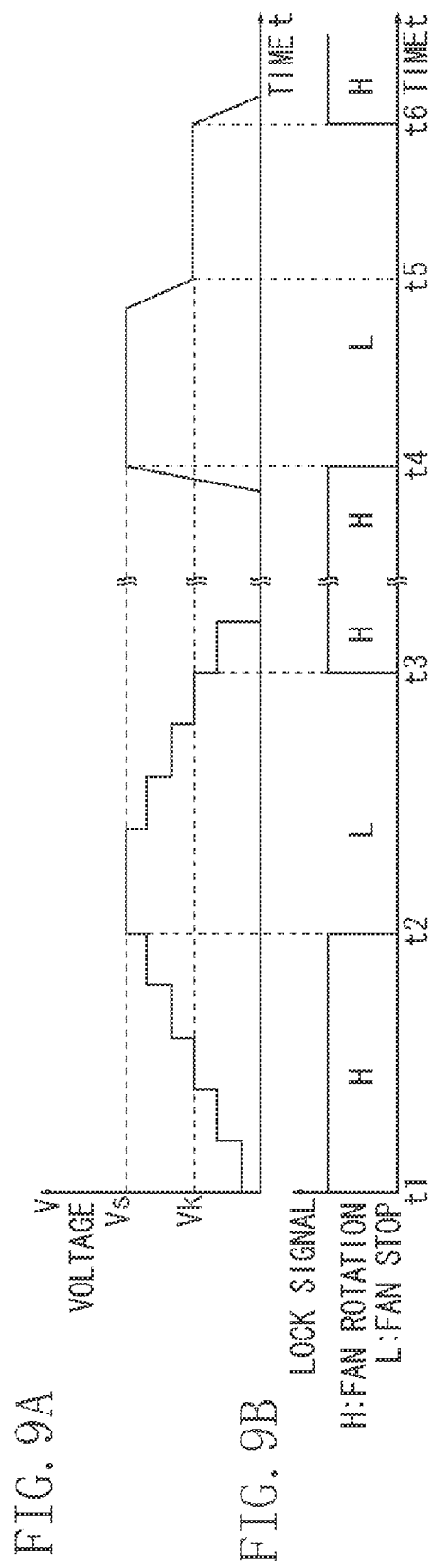
FIGS. 9A and 9B are timing charts illustrating relationships between control of a printer and a voltage applied to a fan and a lock signal detected from the fan.

FIGS. 9A and 9B are timing charts illustrating relationships between control of the printer 102 and a voltage applied to the fan 401 and a lock signal detected from the fan 401. FIG. 9A illustrates the relationship between the control of the printer 102 and the voltage applied to the fan 401. FIG. 9B illustrates the relationship between the control of the printer 102 and the lock signal detected from the fan 401.

The time interval of t1 to t2 corresponds to step S112 (at the time when the voltage applied to the fan 401 is increased and the driving starting voltage Vs is set). The time interval of t2 to t3 corresponds to step S113 (at the time when the voltage applied to the fan 401 is decreased and the driving keeping voltage Vk is set). The time interval of t4 to t5 corresponds to steps S104 to S106 (at the time when the fan 401 is driven by applying the driving starting voltage Vs to the fan 401). The time interval of t5 to t6 corresponds to steps S107 to S109 (at the time when the fan 401 is driven by applying the driving keeping voltage Vk to the fan 401).

According to the present exemplary embodiment, the driving starting voltage or the driving keeping voltage of the fan can be suitably set according to an individual variation or the time elapse of the fan.

In the first exemplary embodiment, the driving starting voltage and the driving keeping voltage of the fan are separately set. However, in a second exemplary embodiment of the present invention, driving voltage patterns are prepared by combining predetermined values of the driving voltage and the driving keeping voltage of the fan, and a suitable driving voltage pattern is set therefrom.

Since the configuration of the apparatus according to the second exemplary embodiment is similar to that of the first exemplary embodiment described with reference to FIGS. 1 to 5, the description thereof will not be repeated.

Figure 10:
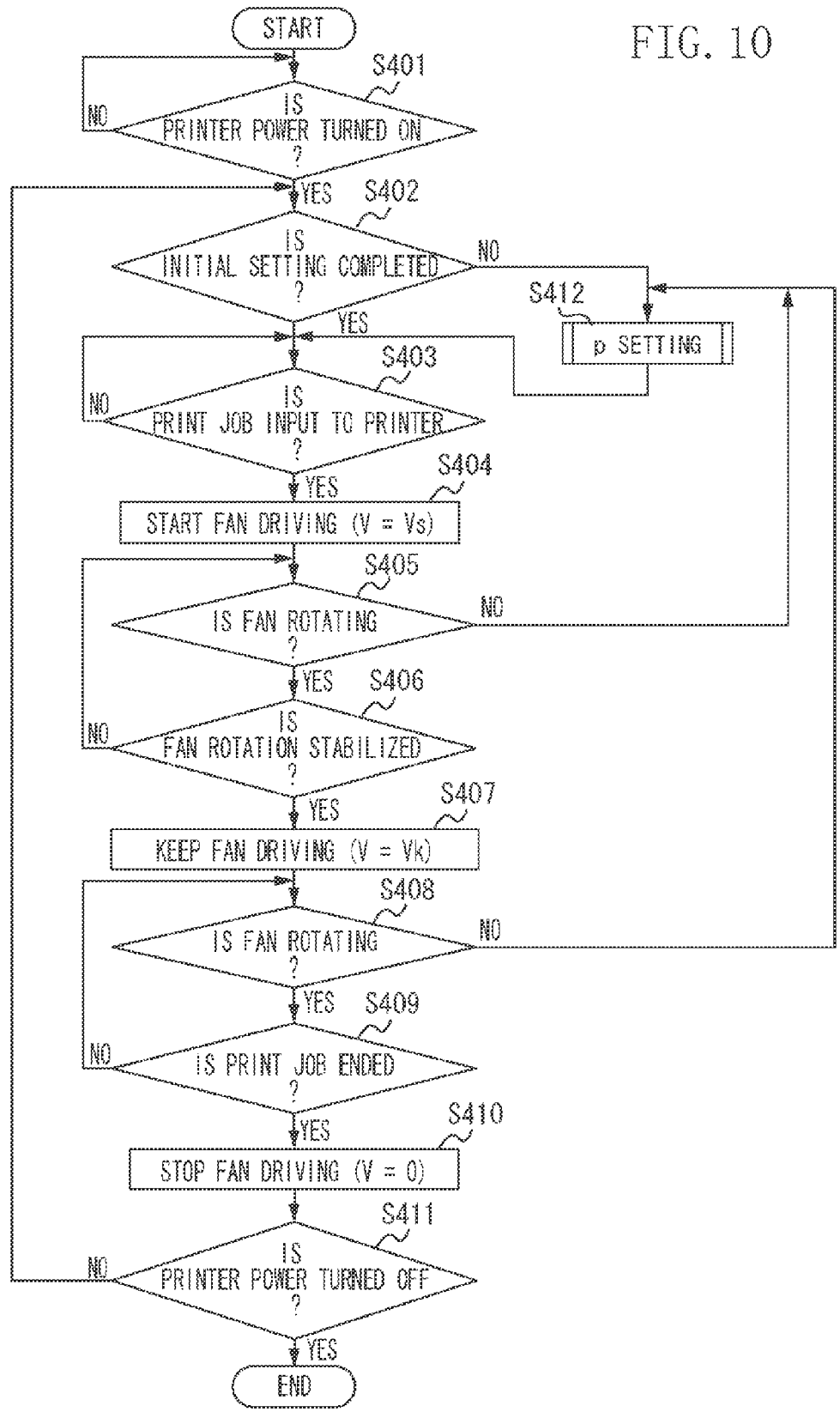
FIG. 10 is a flowchart illustrating control of a printer.

FIG. 10 is a flowchart illustrating control of the printer 102. In addition, the control illustrated in the flowchart is implemented by the CPU 301 reading programs stored in the HDD 304 to the RAM 303 and executing the programs.

First, in step S401, the CPU 301 determines whether the printer 102 is turned on. When the printer 102 is determined to be turned on in step S401, the process proceeds to step S402. When the printer 102 is determined not to be turned on in step S401, the CPU 301 is on standby until the printer 102 is turned on.

Next, in step S402, the CPU 301 determines whether initial setting (of the driving voltage pattern of the fan described below) of the printer 102 is completed. When the initial setting of the printer 102 is determined to be completed in step S402, the process proceeds to step S403. When the initial setting of the printer 102 is determined not to be completed in step S402, the process proceeds to step S412.

Next, in step S403, the CPU 301 determines whether a print job is input to the printer 102 by the reading unit 203 or the network interface 307. When the print job is determined to be input to the printer 102 in step S403, the process proceeds to step S404. When the print job is determined not to be input to the printer 102 in step S403, the CPU 301 is on standby until the print job is input to the printer 102.

Next, in step S404, the CPU 301 allows the fan 401 to start driving by applying the driving starting voltage Vs to the fan 401.

Next, in step S405, the CPU 301 determines whether the fan 401 is rotating with the driving starting voltage Vs applied to the fan 401 in step S104. When the fan 401 is determined to be rotating in step S405, the process proceeds to step S406. When the fan 401 is determined not to be rotating in step S405, the process proceeds to step S412.

Next, in step S406, the CPU 301 determines whether the rotation of the fan 401 is stabilized. When the rotation of the fan 401 is determined to be stabilized in step S406, the process proceeds to step S407. When the rotation of the fan 401 is determined not to be stabilized, the process proceeds to step S405.

Next, in step S407, the CPU 301 keeps the driving of the fan 401 by applying the driving keeping voltage Vk to the fan 401.

Next, in step S408, the CPU 301 determines whether the fan 401 is rotating with the driving keeping voltage Vk applied to the fan 401 in step S407. When the fan 401 is determined to be rotating in step S408, the process proceeds to step S409. When the fan 401 is determined not to be rotating in step S408, the process proceeds to step S412.

Next, in step S409, the CPU 301 determines whether the print job input in step S403 is ended in the printing unit 204. When the print job is determined to be ended in step S409, the process proceeds to step S410. When the print job is determined not to be ended in step S409, the process proceeds to step S408.

Next, in step S410, the CPU 301 stops the driving of the fan 401 by setting the voltage applied to the fan 401 to 0.

Next, in step S411, the CPU 301 determines whether the printer 102 is turned off. When the printer 102 is determined to be turned off in step S411, the control ends. When the printer 102 is determined not to be turned off in step S411, the process proceeds to step S402.

When the initial setting of the printer 102 is determined not to be completed in step S402, then in step S412, the CPU 301 sets the driving voltage pattern p of the fan. Details of step S412 will be described below with reference to FIG. 11.

Figure 11:
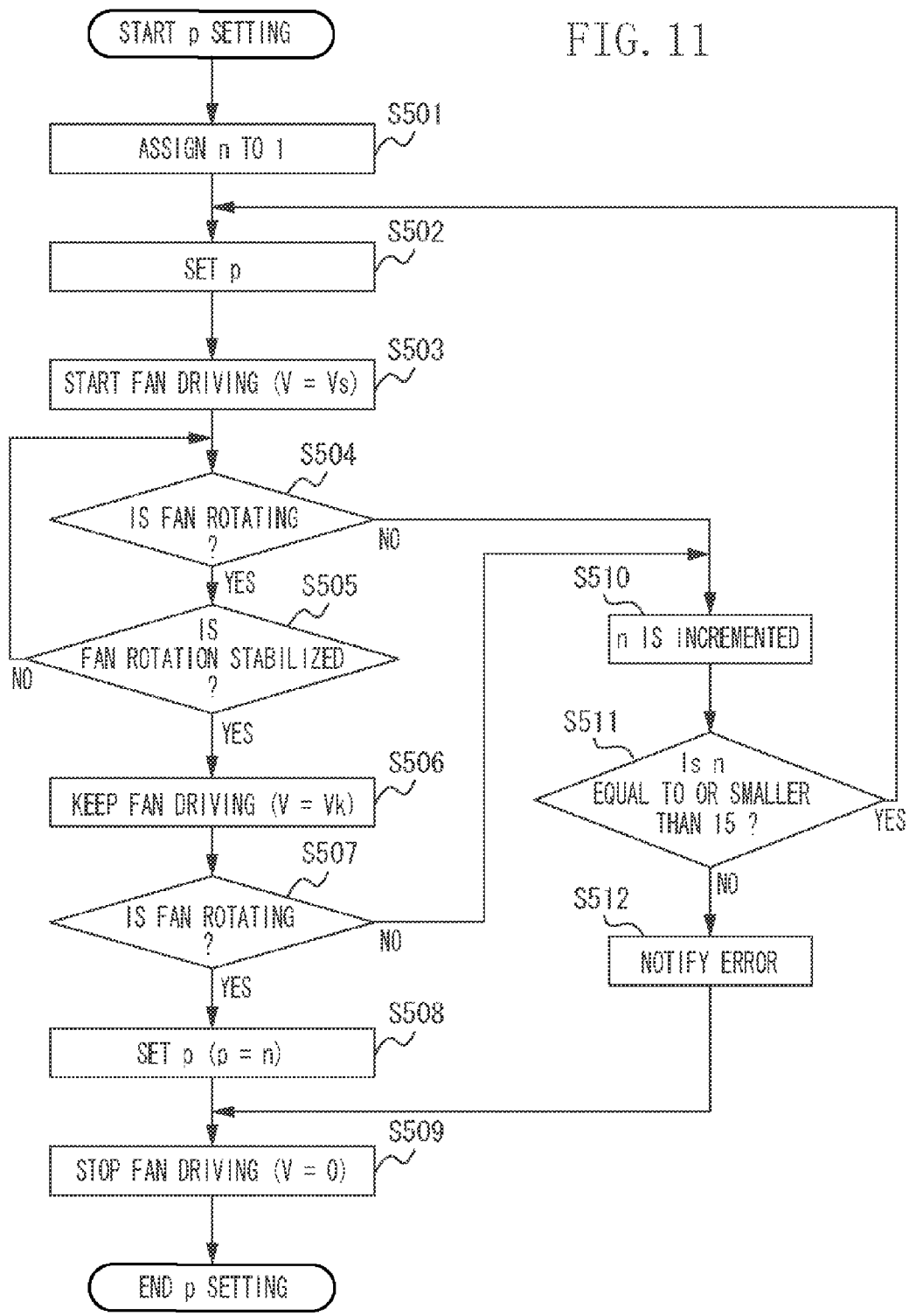
FIG. 11 is a flowchart illustrating details of a driving voltage pattern (p) setting step S412.

FIG. 11 is a flowchart illustrating details of the driving voltage pattern (p) setting step S412.

First, in step S501, the CPU 301 assigns 1 to n.

Next, in step S502, the CPU 301 sets as the driving voltage pattern p the driving starting voltage Vs and the driving keeping voltage Vk corresponding to the case where p is n among the driving voltage pattern p illustrated in FIG. 12.

FIG. 12 is a view illustrating a correspondence between the driving voltage pattern p for the transistor and a combination of the driving starting voltage Vs and the driving keeping voltage Vk.

In FIG. 12, p denotes the driving voltage pattern applied to the transistor, Vs denotes the driving starting voltage for starting the driving of the transistor, and Vk denotes the driving keeping voltage for keeping the driving of the transistor. As illustrated in FIG. 12, according to the increase in the driving voltage pattern p applied to the transistor, the driving starting voltage Vs and the driving keeping voltage Vk corresponding to the driving voltage pattern p are also increased.

Next, in step S503, the CPU 301 allows the fan 401 to start driving by applying the driving starting voltage Vs corresponding to the driving voltage pattern p set to the fan 401 in the S502.

Next, in step S504, the CPU 301 determines whether the fan 401 is rotating with the driving starting voltage Vs applied to the fan 401 in step S503. When the fan 401 is determined to be rotating in step S504, the process proceeds to step S505. When the fan 401 is determined not to be rotating in step S504, the process proceeds to step S510.

Next, in step S505, the CPU 301 determines whether the rotation of the fan 401 is stabilized. When the rotation of the fan 401 is determined to be stabilized in step S505, the process proceeds to step S506. When the rotation of the fan 401 is determined not to be stabilized in step S505, the process proceeds to step S504.

When the rotation of the fan 401 is determined to be stabilized in step S505, in step S506, the CPU 301 keeps the driving of the fan 401 by applying the driving keeping voltage Vk corresponding to the voltage pattern set to the fan 401 in step S502.

Next, in step S507, the CPU 301 determines whether the fan 401 is rotating with the driving keeping voltage Vk applied to the fan 401 in step S506. When the fan 401 is determined to be rotating in step S507, the process proceeds to step S508. When the fan 401 is determined not to be rotating in step S507, the process proceeds to step S510.

When the fan 401 is determined to be rotating in step S507, then in step S508, the CPU 301 sets the value of p to the value of p at the time when the fan 401 is determined to be rotating in step S507 and the values of Vs and Vk to the values of Vs and Vk corresponding to the value of p in FIG. 12.

Next, in step S509, the CPU 301 stops the driving of the fan 401 by setting the voltage applied to the fan 401 to 0.

When the fan 401 is determined not to be rotating in step S504 or S507, then in step S510, the CPU 301 executes an increment of the value of n.

Next, in step S511, the CPU 301 determines whether the value of n after the increment in step S510 is 15 or less. When the value of n is determined to be 15 or less in step S511, the process proceeds to step S502. When the value of n is determined not to be 15 or less in step S511, the process proceeds to step S512.

When the value of n is determined not to be 15 or less in step S511, then in step S512, the CPU 301 notifies to a user an error message that the fan cannot be driven. After step S512, the process proceeds to step S509.

According to the present exemplary embodiment, the driving starting voltage or the driving keeping voltage of the fan can be suitably set according to an individual variation or the time elapse of the fan.

In addition, according to the present exemplary embodiment, the driving starting voltage or the driving keeping voltage of the fan can be more easily set in comparison to the case where the driving starting voltage and the driving keeping voltage are individually set.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-273191 filed Oct. 23, 2008, which is hereby incorporated by reference herein in its entirety.

What is claimed is:

1. An information processing apparatus comprising:
a fan configured to exchange air between inside and outside of the information processing apparatus;
an applying unit configured to apply a voltage to the fan;
a determination unit configured to determine whether the fan is rotating;
a setting unit configured to set a driving keeping voltage for keeping driving of the fan, to a voltage that is higher than a voltage that is applied to the fan by the applying unit, when the fan is determined by the determination unit not to be rotating after decreasing the voltage that is applied to the fan by the applying unit in a state where the fan is rotating;
a storage unit configured to store the driving keeping voltage set by the setting unit; and
a control unit configured to control the applying unit to apply the driving keeping voltage stored in the storage unit to the fan to keep the driving of the fan,
wherein the setting unit sets a driving starting voltage for starting the driving of the fan to the voltage that is applied to the fan by the applying unit when the fan is determined to be rotating by the determination unit by increasing the voltage that is applied to the fan by the applying unit in a state where the fan is not rotating,
wherein the storage unit stores the driving starting voltage set by the setting unit, and
wherein the control unit controls the applying unit to apply the driving starting voltage stored in the storage unit to the fan to start the driving of the fan.

2. The information processing apparatus according to claim 1, wherein the setting unit sets the driving keeping voltage by decreasing the voltage that is applied to the fan by the applying unit by every predetermined amount of voltage in the state where the fan is rotating.

3. The information processing apparatus according to claim 1, wherein the control unit controls the setting unit to set a new driving keeping voltage to a voltage higher than the driving keeping voltage when the driving of the fan cannot be kept by applying the driving keeping voltage to the fan.

4. The information processing apparatus according to claim 1, wherein the fan vents an inner air of the information processing apparatus outwards.

5. The information processing apparatus according to claim 1, wherein the fan intakes an outer air to the information processing apparatus.

6. The information processing apparatus according to claim 1, wherein the setting unit sets the driving starting voltage by increasing the voltage that is applied to the fan by the applying unit by every predetermined amount in a state where the fan is not rotating.

7. The information processing apparatus according to claim 1, wherein the control unit controls the setting unit to set a new driving starting voltage to a voltage higher than the driving starting voltage when the driving of the fan cannot be started by applying the driving starting voltage to the fan.

8. A method for controlling an information processing apparatus having a fan, the method comprising:
applying a voltage to the fan;
determining whether the fan is rotating;
setting a driving keeping voltage for keeping driving of the fan to a voltage that is higher than a voltage that is applied to the fan when the fan is determined not to be rotating after decreasing the voltage that is applied to the fan in a state where the fan is rotating;
storing the set driving keeping voltage; and
keeping the driving of the fan by applying the stored driving keeping voltage to the fan,
wherein the setting sets a driving starting voltage for starting the driving of the fan to the voltage that is applied to the fan when the fan is determined to be rotating by increasing the voltage that is applied to the fan in a state where the fan is not rotating,
wherein the storing stores the driving starting set voltage set, and
wherein the applying is controlled to apply the driving starting voltage stored to the fan to start the driving of the fan.

* * * * *